United States Patent [19]
Richardson

[11] Patent Number: 5,544,991
[45] Date of Patent: Aug. 13, 1996

[54] LOCKING FRUSTRUM NUT

[75] Inventor: John A. Richardson, Windsor, Canada

[73] Assignee: Ford Motor Company, Dearborn, Mich.

[21] Appl. No.: 387,696

[22] Filed: Feb. 13, 1995

[51] Int. Cl.⁶ ............................. F16B 39/12; F16B 39/16
[52] U.S. Cl. ..................... 411/237; 411/244; 411/932
[58] Field of Search ................................. 411/222, 237, 411/244, 204, 931, 932

[56] References Cited

U.S. PATENT DOCUMENTS

| | | |
|---|---|---|
| 470,973 | 3/1892 | Bissell . |
| 632,422 | 9/1899 | McLaughlin ........................ 411/237 |
| 679,618 | 7/1901 | Hanson . |
| 783,572 | 2/1905 | Giggs ................................ 411/237 X |
| 831,009 | 9/1906 | Knopf . |
| 914,053 | 3/1909 | Kenyon ............................. 411/244 |
| 995,468 | 6/1911 | Kenney . |
| 1,288,812 | 12/1918 | Bishop . |
| 1,467,824 | 9/1923 | Ahlers ................................ 411/244 X |
| 1,473,321 | 11/1923 | Rumfelt . |
| 1,717,789 | 6/1929 | Larrad .................................. 411/237 |
| 5,253,849 | 10/1993 | Kamada ........................... 411/204 X |

FOREIGN PATENT DOCUMENTS 181492 6/1922 United Kingdom ................... 411/244

Primary Examiner—Neill R. Wilson
Attorney, Agent, or Firm—Frank G. McKenzie; Roger L. May; James J. Dottavio

[57] ABSTRACT

A two-piece locking nut which includes a first nut (22) having an internal thread and a frusto-conical surface (32) at one end of said first nut, a second nut (28) having an internal thread of opposite hand as the thread of said first nut and a frusto-conical surface (36) at an end of said second nut which is complimentary to and positioned adjacent said frusto-conical surface of said first nut to prevent relative movement therebetween, and the second axial end (38) of the first nut opposite the frusto-conical surface (32) is positioned adjacent a workpiece to prevent axial displacement thereof.

17 Claims, 1 Drawing Sheet

LOCKING FRUSTRUM NUT

BACKGROUND OF THE INVENTION

1. Field of the Invention

The present invention relates to the field of locking nuts, particularly two-piece locking nuts employing opposite handed threads on either nut.

2. Description of the Prior Art

Many different techniques have been used to prevent rotation of a threaded nut after it is secured. Wheel spindle assemblies often use castle nuts with cotter pins, where the spindle is threaded to receive a castle nut, and the spindle has a hole drilled through perpendicular to the axis of the spindle to receive a cotter pin. The cotter pin engages the castle nut and the spindle to prevent rotation of the castle nut. The castle nut design presents problems of an added operation to drill a hole through the spindle for the cotter pin, the difficulties with assembling a cotter pin including the rotational alignment of the nut to the hole in the spindle, insertion and deformation of the pin, and serviceability of the assembly.

A second locking nut design comprises a nut with a keyway machined into the shaft and nut, where a key is installed after the nut is threaded onto the shaft to prevent rotation of the nut to the shaft. This design requires additional machining operations of a key slot into the spindle and nut, plus the additional key component. The key design adds to the complexity of the assembly due to alignment of the key slots and installation of the key. Serviceability of the assembly is also more difficult.

Examples of 2-piece locking nuts which do not require additional parts include double nuts or double nuts with threads of differing pitch, but which use the same hand thread. The first of the same-hand double nuts is typically installed onto a male threaded bolt and tightened to create a clamp load against the part to be secured. The second nut is then installed and secured against the first nut to create a clamp load against the first nut. The reactive clamp load between the nuts produces a resistance to relative rotation of the nuts. This design may fail to act as a locking nut when the resistance to rotation between the first and second nuts is greater than the resistance to rotation between the nuts and the threads. In such a situation, both nuts may rotate simultaneously and the clamp load is lost between the first nut and workpiece, while the clamp load is maintained between the two nuts. Alternatively, if the clamp load between the two nuts is not great enough, the second nut may loosen and the locking nut is functionally now a simple single nut. To overcome this problem, the second nut may have deformable threads or use a chemical locking agent. These designs may be difficult to disassemble. Furthermore, the deformable nut is not reusable, and the chemical locking agent requires reapplication after removal for service.

A two-piece locking nut design which uses a different pitch on either nut includes a second nut with a finer thread than the first nut; thus the second nut must rotate more turns per unit of linear translation than the first nut. Due to the differing rates of rotation, the interference condition between the two nuts is maintained if the nuts rotate simultaneously, because the first nut travels further linearly than the second nut thereby increasing the interference between the nuts. Problems with these designs include the fact the second nut must often be secured to a high torque to create a suitable interference with the resulting resistance to rotation between the nuts, because of the small flat area of contact between the nuts. Additionally, if the frictional resistance from the interference between the first and second nuts is not as great as the frictional resistance between the first nut and the workpiece, the second nut may back off and the first nut will act as a simple single nut.

U.S. Pat. No. 1,473,321 ('321) discloses a design which uses a same-hand double nut locking nut design with varying pitch threads. To overcome the concern of the second nut backing off, '321 uses a beveled or flaired socket on the first nut and a beveled or flaired flange on the second nut which fits into the socket of the first nut. Additionally, '321 includes a malleable washer to grip the nuts at the interface to prevent corrosion and to restrain the second nut from backing off, as described in lines 96–98 of the '321 patent. The '321 design may experience the same problem described above, where the second nut may back off while the first nut is retained by the clamp load against the work piece, and result in a simple single nut system. '321 also requires an additional malleable washer to overcome the problem of the nuts becoming disengaged. In addition to the added expense and operation of installing the malleable washer, compression of the washer requires a work during assembly of the nuts; this work may require a higher torque and may result in a relaxed joint after the assembly is complete. The relaxed joint may then result in an ineffective locking nut.

U.S. Pat. No. 1,467,824 ('824) discloses a design which includes a bolt and two adjacent internally threaded members which have opposite hand threads and a conically tapered interface. The first internally threaded member of '824 is a difficult part to manufacture, consisting of a sleeve 13 with an internal thread and a head 15 formed at one end of the sleeve with an inset taper at both ends 14, 16 of the sleeve. The first end 14 of the sleeve clamps against a conical mating portion 12 near the head of the bolt. The side of the head at the opposite end of the sleeve clamps against the work piece, as described at lines 106–109. The second internally threaded member is a conically-shaped 18 nut 17 which clamps against the inset conical tapered head 16 of the sleeve, opposite the workpiece. The locking nut feature of '824 requires a conical interface between the sleeve and the bolt head, as described on the second page of the specification at lines 15–19. Problems with this design include the inability to clamp varying thickness workpieces, because the thickness of the workpiece is dictated by the distance between the first end of the sleeve which clamps against the bolt and the head of the sleeve which clamps against the workpiece. The '824 design thus requires the length of the threaded sleeve and workpiece to be precise to create a clamp load. The sleeve is a complicated part to manufacture, as it has a long internal thread, a hex head at one end, and an internal conical surface at both ends. The length of the sleeve dictates how far the sleeve must be threaded during installation. Thus a long sleeve will require numerous rotations to secure against the head of the bolt, requiring time at assembly and disassembly.

It would be desirable to have a two-piece locking nut design which is simple to manufacture, assemble, and service, and which accommodates varying thickness workpieces, plus overcome the problem of simultaneous loosening of the nuts.

SUMMARY OF THE INVENTION

Accordant with the present invention, a two-piece locking nut that is simple to manufacture and install, accommodates varying thickness workpieces, and which prevents simultaneous loosening of the nuts has been discovered. The locking nut comprises two nuts, the first of which has an internal thread and a frusto-conical first surface at one end. The first nut clamps the workpiece at a second surface at the end of the nut opposite the frusto-conical surface. A second nut has an internal thread of opposite hand as the thread of the first nut, and a complimentary frusto-conical surface at one end. The frusto-conical surfaces of the nuts are positioned adjacent each other to prevent relative movement therebetween.

The locking nut of the present invention is particularly useful in an automotive wheel spindle application.

DETAILED DESCRIPTION OF THE PREFERRED EMBODIMENTS

Figure 1:
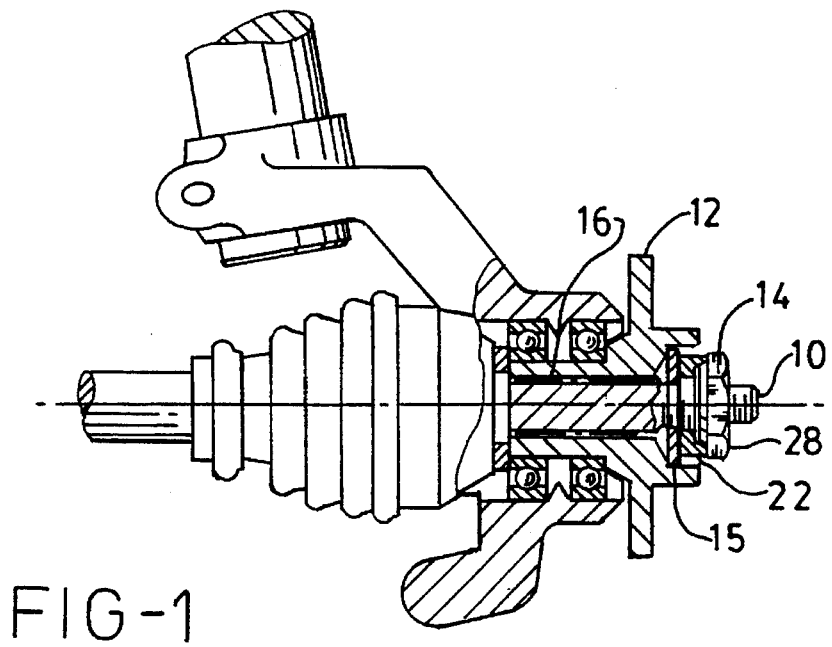
FIG. 1 is a cross sectional view of a lateral plane through an automotive wheel spindle incorporating an embodiment of the present invention.

Referring first to FIG. 1, there is generally shown a cross section of a wheel spindle assembly which embodies the features of the present invention. The wheel spindle assembly includes a spindle 10 and hub 12 typical of a front driven wheel of motor vehicle. Additionally, a locking nut assembly 14 is generally shown secured to the spindle 10 for retaining the hub 12 to the spindle stem 10. A washer 15 is arranged between the hub 12 and locking nut assembly 14. The spindle 10 has a splined first surface 16 on which the hub is mounted.

Figure 2:
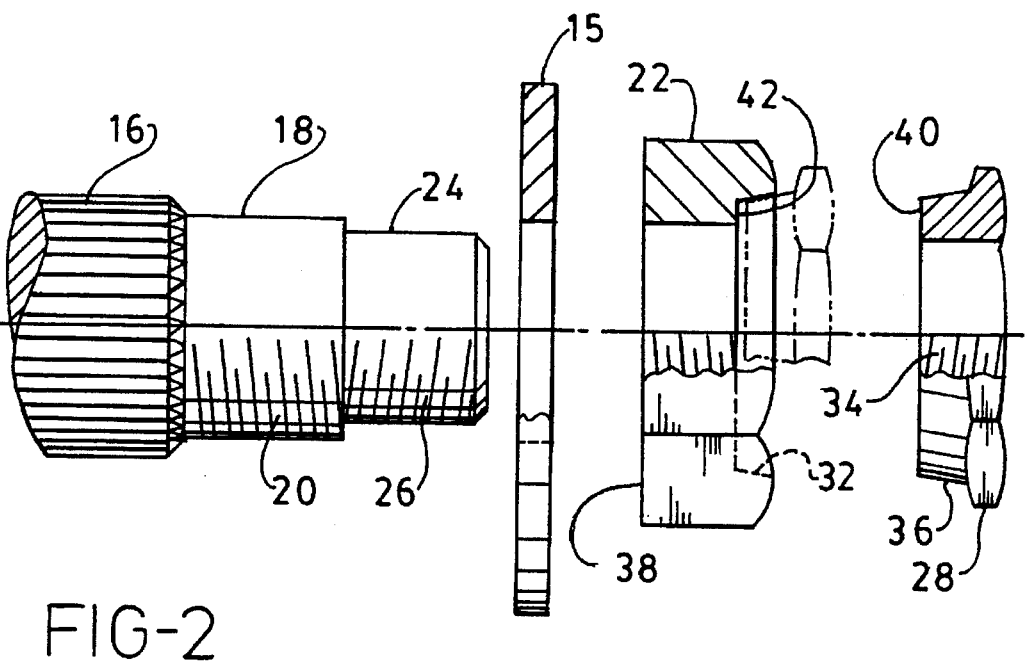
FIG. 2 is a partial cross sectional exploded view of the spindle, washer and nuts illustrated in FIG. 1.

Referring now to FIG. 2, the nut assembly 14, washer 15, and spindle 10 are generally shown in an exploded partial sectional view. The spindle has a second surface 18 which has an external first thread 20 to accommodate a first nut 22. The spindle has a third surface 24 with an external second thread 26 to accommodate a second nut 28. In the preferred embodiment, the diameter of the second surface is of a reduced diameter from the splined first surface, and the diameter of the third surface is further reduced from the second surface to facilitate assembly of the hub, washer and nuts.

The first nut 22 has a first internal thread 30 and first frusto-conical surface 32. The second nut 28 has a second internal thread 34 of opposite hand as the thread 30 of first nut 22 and a second frusto-conical surface 36, complimentary to the frusto-conical surface 32 on the first nut 22. As shown in FIG. 1, the first nut 22 is threaded onto the first external thread 20 of the second surface 18 of the spindle 10. The first nut has a fourth surface 38 which abuts the washer 15 to axially retain the washer 15 and hub 12.

In the preferred embodiment, the first external thread 20 and first internal thread 30 are M32×1.5 right hand threads. In the preferred embodiment, the second external thread 26 and second internal thread 34 are M28×5 left hand threads. The hand of the threads could be reversed such that the first threads would be left handed and the second threads would be right handed. Additionally, the size and pitch of the thread may be varied, dependent upon the application; for example, the present invention could be used to replace the castle nut and cotter pin on a tie rod. The components in such an application would generally be smaller and therefore generally require a smaller diameter thread.

In the preferred embodiment, the first nut 22 has a female frusto-conical surface 32 (or cavity) and the second nut 28 has a male frusto-conical surface 36 (or protrusion). However, it is expected that the orientation of the male surface 36 and female surface 32 may be reversed, depending upon the application, so the first nut has a male surface and the second nut has a female surface. As the second nut 28 is secured to the spindle 10, the frusto-conical surfaces 32, 36 are mated. The shape of these surfaces creates a wedge-effect, increasing the surface area of engagement, and therefore the effectiveness of the locking feature between the nuts. In the preferred embodiment, the frusto-conical surfaces 32, 36 have a 21 degree included angle. This included angle is the angle between the frusto-conical surfaces if these surfaces were projected to a point. The resulting wedge-effect for the 21 degree included angle is thus 5.44 times the resistance of a conventional double nut interface (or $1/(\sin 21/2)$). This angle may be varied to change this wedge-effect as desired. The range of included angles which provide the most desirable condition was found to be between 14 and 30 degrees, but may be outside this range if a greater or lesser resistance to disassembly of the lock nut is desired.

In the preferred embodiment of the present invention, the length of the male surface 36 and depth of the female surface 32 are such that the engagement of the frusto-conical surfaces prevent the first end 40 of the second nut 28 from contacting the bottom surface 42 of the female surface 32 on the first nut 22. Otherwise, the conical surfaces would not engage and provide the wedge-effect as described above. To achieve this result in the preferred embodiment, the outside diameter of the first end 40 of the second nut 36 is 39 mm, the inside diameter at the bottom 42 of the cavity 32 of the first nut 38 is 38.25 mm, and the depth of the cavity 32 is 5 mm. These dimensions may be varied according to the application.

In the preferred embodiment, the external surfaces of the nuts have a hexagonal shape to accomplish tightening of the nuts to the shaft. However, this may be achieved by any known means of securing threaded fasteners.

The forms of the invention shown and described herein constitute the preferred embodiment and a second example of the invention; it is not intended to illustrate all possible forms thereof. Understand that the words used are words of description rather than of limitation, and that various changes may be made from that which is described here without departing from the spirit and scope of the invention.

What is claimed is:

1. A locking nut to prevent axial displacement of a workpiece, comprising:

a first nut having a first internal thread, a frusto-conical cavity at a first axial end of said first nut, a second surface at a second axial end of said first nut, wherein said second surface of said first nut is positioned adjacent the workpiece to prevent axial displacement thereof;

a second nut having a second internal thread of opposite hand as said first thread of said first nut, a second frusto-conical surface at an axial end of said second nut, wherein said second frusto-conical surface of said second nut is complimentary to and positioned adjacent said cavity of said first nut to prevent relative movement therebetween.

2. The locking nut of claim 1, wherein the frusto-conical surfaces of the nuts have an included angle between 14 and 30 degrees.

3. The locking nut of claim 1, wherein the nuts have an external hexagonal shape.

4. The locking nut of claim 1, wherein the first thread of the first nut is right-handed and the second thread of the second nut is left-handed.

5. The locking nut of claim 1, wherein the first thread of the first nut is left-handed and the second thread of the second nut is right-handed.

6. A locking nut to prevent axial displacement of a workpiece, comprising:

a first nut having a first internal thread, a frusto-conical cavity at a first axial end of said first nut, said cavity having a first surface at the bottom of said cavity, said first nut further having a generally planar second surface at a second axial end of said first nut, wherein said second surface of said first nut is positioned adjacent the workpiece to prevent axial displacement thereof;

a second nut having a second internal thread of opposite hand as the first thread of said first nut, a frusto-conical protrusion at an axial end of said second nut, wherein said protrusion of said second nut is complimentary to and positioned adjacent said cavity of said first nut to prevent relative movement therebetween, and said protrusion does not contact said first surface at the bottom of said cavity of said first nut.

7. The locking nut of claim 6, wherein the frusto-conical surfaces of the nuts have an included angle between 14 and 30 degrees.

8. The locking nut of claim 6, wherein the nuts have an external hexagonal shape.

9. The locking nut of claim 6, wherein the first nut has a right-handed thread and the second nut has a left-handed thread.

10. The locking nut of claim 6, wherein the first nut has a left-handed thread and the second nut has a right-handed thread.

11. A locking nut assembly to prevent axial displacement of a wheel hub, comprising:

a spindle having a first end, a longitudinal first surface with a twice-reduced outside diameter adjacent said first end, a first external thread on said first surface, a second longitudinal surface with a reduced outside diameter adjacent said first threaded surface, a second external thread on said second surface, said second external thread of opposite hand as said first threaded surface;

a wheel hub mounted on said spindle;

a first nut having a first internal thread, a frusto-conical cavity at a first axial end of said first nut, a first surface at a second axial end of said first nut, said first nut threadably engaged with said second threaded surface of said shaft and said second surface of said first nut is positioned adjacent said wheel hub to prevent axial displacement thereof;

a second nut having an internal thread of opposite hand as the thread of said first nut, a frusto-conical protrusion at an axial end of said second nut, and said protrusion of said second nut is complimentary to and positioned adjacent said cavity of said first nut to prevent relative movement therebetween.

12. The locking nut assembly of claim 11, wherein the first surface of said first nut is generally planar.

13. The locking nut assembly of claim 11, wherein the nuts have an external hexagonal shape.

14. The locking nut assembly of claim 11, wherein the first nut has a right-handed thread and the second nut has a left-handed thread.

15. The locking nut assembly of claim 11, wherein the first nut has a left-handed thread and the second nut has a right-handed thread.

16. The locking nut assembly of claim 11, wherein the spindle and nuts are made from a steel alloy.

17. The locking nut assembly of claim 11, wherein a washer is positioned between said first nut and said hub.

* * * * *